Figure 1:
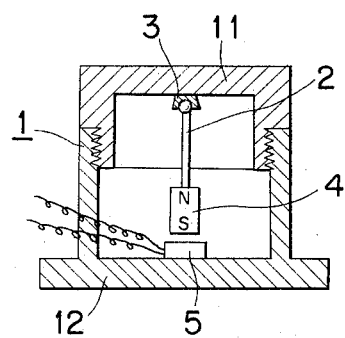

United States Patent [19]
Shimizu et al.

[11] 3,867,844
[45] Feb. 25, 1975

[54] ACCELERATION SENSOR
[75] Inventors: Tetsuji Shimizu, Nagoya; Tatsuo Kato, Inazawa, both of Japan
[73] Assignee: Kabushiki Kaisha Tokai Rika Denki Seisakusho, Aichi Prefecture, Japan
[22] Filed: May 18, 1973
[21] Appl. No.: 361,567

[30] Foreign Application Priority Data
May 20, 1972 Japan.............................. 47-49556

[52] U.S. Cl............................................. 73/517 R
[51] Int. Cl. ........................................... G01p 15/08
[58] Field of Search...... 73/517 R, 514, 492, 516 R, 73/510, 71.2; 200/61.45 M; 33/366, 391, 2, 395, 309; 340/261, 262

[56] References Cited
UNITED STATES PATENTS
| | | | |
|---|---|---|---|
| 2,665,896 | 1/1954 | Kirby et al. | 73/516 R X |
| 3,023,626 | 3/1962 | Bonnell | 73/517 R |
| 3,359,538 | 12/1967 | Raphael | 73/71.2 X |
| 3,363,470 | 1/1968 | Yavne | 73/515 |
| 3,754,225 | 8/1973 | Gleason | 340/261 X |

FOREIGN PATENTS OR APPLICATIONS
1,007,278  2/1952  France.............................. 340/262

OTHER PUBLICATIONS
IBM Technical Disclosure Bulletin — Page 3,781, of Vol. 15, No. 12, dated May, 1973.

Primary Examiner—James J. Gill

[57] ABSTRACT

An acceleration sensor comprises a magnet which is suspended vertically within a case and displaceable in response to acceleration applied in all horizontal directions and an electromagnetic transducer element arranged just below said magnet element. When the magnet is displaced due to acceleration, the acceleration is detected from the variation of an electric current flowing through said transducer element.

1 Claim, 2 Drawing Figures

ACCELERATION SENSOR

This invention relates to an acceleration sensor and more particularly to an acceleration sensor for a car to detect acceleration when a given acceleration is applied to the car.

With the recent development of expressway network, the average speed of a car has increased, and with the increase of car speed, traffic accident has also increased. Therefore, it is obligatory to develop a safety car which can detect the various conditions thereof at all the time, and guarantee safe driving based on such information. As an example of a device guaranteeing safe driving, there is a seat belt. One type of the seat belt is such a seat belt equipped with an emergency locking winder that while it can freely release and retract a belt with no restraint by a winder during parking and usual running, it can prevent the release and retraction of the belt by restraining by the winder upon collision, the application of instantaneous brake and the application of a given acceleration (usually 0.3–0.7G or more) to a car. Various kinds of acceleration sensors to detect such acceleration have heretofore been proposed. However, the conventional acceleration sensors comprise an inertia element and a actuator adapted to actuate a switch by the inertia element. They have a disadvantage of poor durability and low reliability because they have contacts and operate mechanically.

The present invention has been achieved to eliminate the above mentioned disadvantage.

Essentially, according to the present invention, there is provided an acceleration sensor comprising a casing; a magnet which is suspended vertically within said casing and displaceable in response to acceleration applied in all horizontal directions; and an magneto electric transducer element arranged just below said magnet whereby the displacement of said magnet due to acceleration causes variation of an electric current flowing through said transducer element to detect the acceleration.

One object of the present invention is, accordingly, to provide an acceleration sensor having greater durability and reliability compared with the conventional contact type ones, by avoiding mechanical operational parts and contacts.

Another object of the present invention is to provide an acceleration sensor which is simple in construction and can be manufactured at low cost.

Still another object of the present invention is to provide an acceleration sensor which can response sensitively to acceleration from right, left, forward and rearward directions, by detecting acceleration in all horizontal directions.

Figure 2:
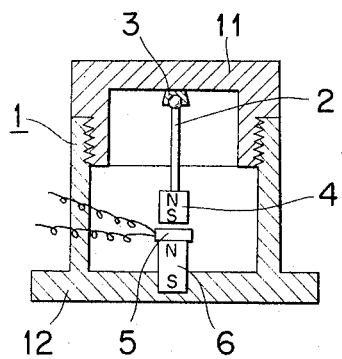

The present invention will be apparent to those skilled in the art from the following description taken in connection with the accompanying drawing, in which:

FIG. 1 is an elevational section of a acceleration sensor embodying the present invention; and FIG. 2 is an elevational section of another embodiment thereof.

Referring to FIG. 1, a casing 1 comprises an upper half member 11 and a lower half member 12 which are threadly engaged with each other. A bar 2 is mounted in the center of the lower surface of the upper half member 11 by means of a ball joint 3. A magnet 4 is fixed on the lower end of the bar 2. The magnet 4 is magnetized in the vertical direction. Numberal 5 shows an magneto-electric transducer element such as Hall element, SMD (abbreviation of SONY MAGNET DIODE and trade name of an magneto-electric transducer manufactured and sold by Sony Corporation, Japan) or the like, which is fixed on the upper surface of the lower half member 12 just below the magnet 4, with the casing 1 placed horizontally.

The function of the acceleration sensor of the present invention having the above mentioned construction will be explained below. The casing 1 is horizontally mounted on a mobile body such as an automobile, etc. When the automobile is running usually, current flowing through the magneto-electric transducer element 5 does not change, since magnetic flux from the magnet 4 acts on the magneto-electric transducer element 5. Therefore, no output is produced in a circuit connected to the magneto-electric transducer element 5.

When an acceleration greater than a given value is applied to the mobibe body by sudden start, sudden stop, running at steep curve or collision, magnetic flux acting on the magneto-electric transducer element 5 decreases, since the magnet 4 swings greatly round the ball joint 3 as fulcrum. Accordingly, the winder for the seat belt can be locked to prevent the release and retraction of the belt, by detecting the great change of current flowing through the magneto-electric transducer element 5 by an electric circuit according to necessity.

In another embodiment of the present invention shown in FIG. 2, in addition to the magnet 4, a further magnet 6 is fixed to the lower part of the magneto-electric transducer element 5, so that the upper pole of the magnet 6 attracts the lower pole of the magnet 4.

Therefore, the magnet 4 can not move by slight vibration or inclination, since the magnet 4 is attracted by magnetic flux of the magnet 6. For this reason, unless acceleration greater than some value is applied to a mobile body, current flowing through the magneto-electric transducer element 5 does not change, and the malfunction of the acceleration sensor can be prevented.

As mentioned above, the present invention comprises a magnet which is perpendicularly suspended within a casing and shifts due to acceleration applied thereto in horizontal direction, and an magneto-electric transducer element whose current changes according to the shift of the magnet.

Therefore, when acceleration is applied to the acceleration sensor, current flowing through the magneto-electric transducer element changes. Consequently, according to the present invention, since acceleration can be detected by detecting the above mentioned current change, the acceleration sensor operates without any electric contacts and hence, has great durability and reliability.

As the magnet shifts in all horizontal directions the acceleration sensor has advantages of capability of detecting acceleration in all horizontal directions, simple construction, low manufacturing cost, etc.

What is claimed is:

1. An acceleration sensor comprising a casing; a first magnet suspended vertically within said casing by means of a ball joint; a semiconductive magneto-electric transducer element arranged just below said magnet; and a second magnet fixed to the casing and to the lower part of said semiconductive magnetoelectric transducer element in the attractive relationship with said first magnet, whereby the displacement of said first magnet due to acceleration greater than a predetermined value causes variation of an electric current flowing through said transducer element to detect the acceleration.

* * * * *